Dec. 20, 1955
E. T. LINDEROTH
2,727,535
AERODYNAMIC CHECK VALVE
Filed Jan. 17, 1950
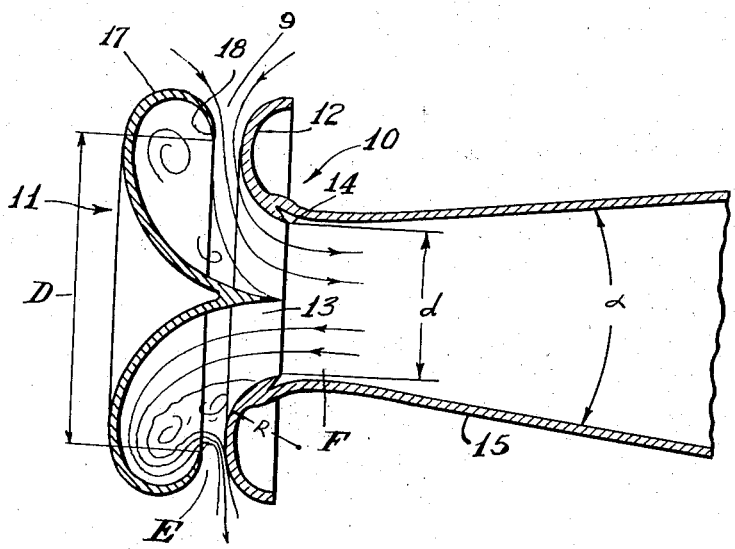
INVENTOR:
ERIK TORVALD LINDEROTH
by
Richardson, Davis and Nordon
ATTYS United States Patent Office 2,727,535
Patented Dec. 20, 1955

2,727,535

AERODYNAMIC CHECK VALVE

Erik Torvald Linderoth, Stockholm, Sweden

Application January 17, 1950, Serial No. 139,015

Claims priority, application Sweden January 29, 1949

3 Claims. (Cl. 138—37)

The present invention relates to an aerodynamic check valve type of nozzle or a combination of gas nozzles having such a shape that the resistance of flow in one direction, the reverse direction, is so much greater than in the opposite or forward direction, that the nozzle operates as a non-return or check valve, if it is connected to a gas chamber in which the pressure in one way or another is caused to pulsate, for instance by intermittent heating, or alternatively cooling, or both of a gaseous medium contained in said chamber.

An aerodynamic non-return or check valve according to the invention is characterized by a venturi tube provided with an annular sharp edge in or in front of the narrowest part of the venturi tube, said sharp edge facing the reverse direction of flow so that a disengagement or constriction of the gas flow is obtained when flowing in the reverse direction and the least possible resistance is presented, when the gas flows in the forward direction. In the specific form of the invention which is herein shown and described a further such sharp edge is added in the form of a separate deflection nozzle arranged immediately behind the venturi tube, said deflection nozzle having such a shape that the gas jet emerging from the venturi tube during the reverse flow is forced to be deflected twice, simultaneously with subjection to a strong constriction during the outward flow.

The accompanying drawing illustrates a preferred embodiment of an aerodynamic check valve in accordance with the invention.

In the drawing, the single figure is a fragmentary diagrammatic view in longitudinal section showing of an aerodynamic check valve in accordance with the invention.

For comprehension of the inventive idea and the manner of operation of the suggested devices reference is made to Bernoulli's Theorem and to the manner of operation of a venturi tube. A common venturi tube is characterized by a softly curved entrance portion and a long conical (diffusor-shaped) delivery portion. It is possible with such a tube to obtain very high velocities in the narrowest or throat section with a small resistance to flow, due to the recovery of pressure that is obtained in the diffusor shaped delivery portion. In the entrance portion the pressure falls, thus transforming pressure energy to velocity energy and in the conical delivery portion a transformation of energy in the opposite direction is carried out, i. e. from velocity to pressure.

Referring to the drawing, there is shown an aerodynamic check valve comprising a venturi tube portion designated generally as 10 and an annular deflector nozzle portion designated generally as 11 spaced from the venturi tube portion 10 and coaxially disposed immediately behind the venturi tube portion 10. The venturi tube portion 10 and deflection nozzle portion 11 are held spaced apart by any desired means (not shown) to define an annular space or gas passage 9 of annular cross-sectional area E therebetween.

The venturi tube portion 10 comprises an inlet portion 12 in the shape of a smoothly rounded curvedly flaring funnel having a radius of curvature R. The inlet portion 12 terminates at the throat portion 13 of the venturi tube 10 in a sharp forwardly directed flow controlling edge 14. The inlet portion 12 communicates with a divergent outlet portion 15 of the venturi tube 10 which is of a length greater than the length of the inlet portion 12.

The deflector nozzle portion 11 of the check valve of the drawing comprises a sharp forwardly directed central conically pointed portion 16 which extends partially into the funnel-shaped inlet 12 of the venturi tube portion 10. The pointed portion 16 is surrounded by a curved wall 17 which terminates in a radially inwardly directed sharp circular edge 18 so that the deflecting nozzle portion 11 of the check valve is provided with a generally toroidally shaped interior for deflecting reverse flowing gases as described in greater detail below.

According to the present invention a recovery of pressure during flow in the reverse direction is prevented by the annular sharp forwardly directed edge 14 provided at the narrowest section or throat 13 of the venturi tube portion 10. When there is a flow in the reverse direction, this sharp edge causes the flow to be disengaged or directed inwardly from the surface of the throat portion of the venturi tube, so that the air flow tends to continue in a free jet of reduced cross-sectional area as it passes rearwardly beyond the sharp edge. When there is a flow in the forward direction, the flow is only slightly affected by the edge, if it is shaped as shown. The course of pressure will thus remain practically unchanged in the forward direction, while the resistance in the reverse direction is immensely increased. The resistance in the reverse direction considering only the venturi tube portion 10 of the construction shown may well be about 10 times larger than the resistance in the forward direction. A necessary condition for this is that the venturi tube is so shaped that the angle $\alpha$ of divergence of its conical part 15 is at most 12°, but preferably 5–10° and that the ratio between the areas of the narrowest and widest section is below the value 0.5 and preferably should be chosen between 0.3–0.1. The radius R of the entrance portion should be at least 25% of the smallest section diameter $d$ and should preferably be chosen between 0.3 and 1 $d$. D is the diameter of the largest section.

The gases flowing in the reverse direction, after constriction into a compact jet by the sharp forwardly directed edge 14, pass along the pointed conical portion 16 of the deflection nozzle 11 and enter the toroidally shaped interior of deflection nozzle 11 defined by the curved wall 17. In passing through the toroidal interior of the nozzle 11, the reverse flowing gases are deflected through an angle of approximately 270° so that as they reach the radially inwardly directed sharp edge 18 they are moving radially inwardly toward the pointed portion 16. This requires that the reverse flowing gases be subjected to a further deflection through an additional angle of about 180° before they can emerge from the check valve through the annular space 9 between the venturi tube portion 10 and the deflection nozzle portion 11.

Due to the abrupt deflection around the sharp edge 18 of the nozzle 11 a constriction of approximately 30% can be obtained in the annular area E formed between the nozzle 11 and the entrance portion 12 of the venturi tube.

A constriction of 30% in itself involves an increase of resistance of well over 10 times compared to the unconstricted flow through a nozzle having a softly curved entrance portion. In combination with a venturi tube (according to the drawing) which recovers 90% of the pressure drop in the narrowest section, the resistance in the forward direction should be a hundredth of the resistance in the reverse direction, if the magnitude of the annular area E is equal to that of the cross-sectional area F of throat 13 at the narrowest section of the venturi tube.

Even if double the resistance in the forward direction is used as a basis for calculation, the ratio between the resistances in the forward and reverse directions will still be approximately 1:50. Due to the increase of resistance in the forward direction by the addition of the deflection nozzle 11 the maximum valve action is not obtained when the annular area E is equal to the minimum cross-sectional area F of the venturi tube at its throat 13, but this will first be accomplished when the annular area E is a little larger than the throat area F. A suitable value of E/F lies between 1 and 2. The diameter D of the deflection nozzle 11 should be between 1.5–3 times the diameter $d$ of the smallest section.

As will be seen from the above, the combination of the venturi tube with a deflection nozzle facing the reverse flow involves a considerable combined effect, as the valve action of the construction will be much greater than the total check valve action which may be obtained by adding that of each individual element, operating separately. Should they be connected to a pipe-line and spaced sufficiently for preventing them from affecting one another, the total check valve action obtained will, moreover, not even be a total of the separate actions, for which reason the increased effect described must entirely be ascribed to the special combination according to the invention.

I have shown and described what I believe to be the best embodiments of my invention. However, it will be apparent to those skilled in the art that many changes and modifications may be made in the specific illustrative embodiments of the invention which are herein disclosed without departing from the scope of the invention as defined in the appended claims.

What is claimed is:

1. A continuously open air inlet check valve adapted for use with a combustion chamber in which intermittent combustion takes place, said valve comprising a venturi tube including a convergent inlet portion and a divergent outlet portion, said outlet portion being of a length greater than that of said inlet portion, said inlet portion being in the shape of a curvedly flaring funnel terminating at its small end in a sharp forwardly directed edge, and an annular deflecting nozzle disposed on the inlet side of said venturi tube and spaced therefrom to define an annular opening therebetween, said nozzle being interiorly generally toroidally shaped to deflect gases flowing in the reverse direction through an angle of substantially 270 degrees toward the center of said nozzle, whereby said gases flowing in said reverse direction must be deflected through a further angle of about 180 degrees in the opposite direction before they can emerge through said annular opening.

2. A valve according to claim 1 wherein the ratio of the diameter of said deflecting nozzle at said annular opening to the diameter of said small end of said funnel ranges between 1.5 and 3.0.

3. A valve according to claim 1 wherein the spacing between said nozzle and said venturi tube is such that the ratio of the area of said annular opening to the area of said small end of said funnel ranges between 1 and 2.

References Cited in the file of this patent

UNITED STATES PATENTS

| | | |
|---|---|---|
| 1,228,608 | Scanes | June 5, 1917 |
| 1,236,793 | Warman | Aug. 14, 1917 |
| 1,393,654 | Wales | Oct. 11, 1921 |
| 1,776,741 | Schwab | Sept. 23, 1930 |
| 1,801,007 | Jezler | Apr. 14, 1931 |
| 2,022,957 | Drouin | Dec. 3, 1935 |
| 2,102,800 | Killmeyer et al. | Dec. 21, 1937 |
| 2,110,986 | Kadenacy | Mar. 15, 1938 |
| 2,375,180 | Vigo | May 1, 1945 |
| 2,456,626 | Dahnke | Dec. 21, 1948 |
| 2,475,832 | Gilliland | July 12, 1949 |
| 2,525,782 | Dunbar | Oct. 17, 1950 |
| 2,574,460 | Bohanon | Nov. 13, 1951 |
| 2,581,316 | Wolfersperger | Jan. 1, 1952 |

FOREIGN PATENTS

| | | |
|---|---|---|
| 412,478 | France | May 3, 1910 |
| 860,896 | France | Oct. 7, 1940 |